(12) United States Patent
Choi et al.

(10) Patent No.: US 6,650,374 B2
(45) Date of Patent: Nov. 18, 2003

(54) DIGITAL TELEVISION RELAY SYSTEM

(75) Inventors: Kwang-Joo Choi, Kyungki-Do (KR);
Seong-Hwan Oh, Kyungki-Do (KR);
Cheol Lee, Kyungki-Do (KR);
Byung-Heon Lee, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 539 days.

(21) Appl. No.: 09/738,985

(22) Filed: Dec. 19, 2000

(65) Prior Publication Data

US 2001/0005234 A1 Jun. 28, 2001

(30) Foreign Application Priority Data

Dec. 24, 1999 (KR) ............................................. 99-61920

(51) Int. Cl.$^7$ ................................................ H04N 5/38
(52) U.S. Cl. ...................... 348/723; 348/724; 348/725; 348/726
(58) Field of Search ................................ 348/723, 724, 348/725, 726, 727, 728, 729, 607, 608, 21, 470, 426.1, 425.2, 385.1, 388.1, 389.1, 423.1; 375/240.26, 297; H04N 5/38, 5/40, 5/44, 5/455

(56) References Cited

U.S. PATENT DOCUMENTS

| 6,005,605 | A | | 12/1999 | Kostreski | |
|---|---|---|---|---|---|
| 6,185,255 | B1 | * | 2/2001 | Twitchell et al. | 375/240.25 |
| 6,278,743 | B1 | * | 8/2001 | Templin | 375/296 |
| 6,285,412 | B1 | * | 9/2001 | Twitchell | 348/608 |
| 6,466,628 | B1 | * | 10/2002 | Kim | 375/297 |
| 6,559,898 | B1 | * | 5/2003 | Citta et al. | 348/723 |

\* cited by examiner

Primary Examiner—John Miller
Assistant Examiner—Trang U. Tran
(74) Attorney, Agent, or Firm—Fleshner & Kim, LLP (57) ABSTRACT

The present invention relates to a digital television relay system for relaying wirelessly a broadcasting signal discharged from a broadcasting station. In order to cover shadow areas of the digital broadcasting channel signal discharged from a digital television transmitter, the present invention receives the broadcasting channel signal of a certain frequency discharged from the broadcasting station, performs channel-decoding, compensates a transmission error occurred in space, and relays it wirelessly to a subscriber in the shadow areas. Accordingly, the present invention can provide a digital television broadcasting service with transmission quality same with the broadcasting station to the subscriber in the shadow areas.

20 Claims, 6 Drawing Sheets

DIGITAL TELEVISION RELAY SYSTEM

BACKGROUND OF THE INVENTION

1. Field of the Invention

The present invention relates to a digital television broadcasting system, in particular to a digital television relay system which is capable of relaying a broadcasting signal discharged from a broadcasting station wirelessly.

2. Description of the Prior Art

A digital television broadcasting is being watched with keen interest in respect of providing a multimedia communication service to a subscriber. A terrestrial digital television transmission method can be divided into a COFDM (Coded Orthogonal Frequency Division Multiplexing) transmission method based on a DVBT (Digital Video Broadcasting-Terrestrial) standard of Europe and a 8 VSB (Vestigial Side Band) transmission method based on an ATSC (Advanced Television System Committee) standard of North-America.

The digital television broadcasting in accordance with the ATSC standard is transmitted with a MPEG2-TS (Moving Picture Expert Group 2-Transport Stream) format, accordingly it is possible to multiply video and audio data and transmit it through a high speed channel, and it is also possible to perform an interactive data service besides the digital television broadcasting. In addition, the digital television broadcasting method adapts a 8 VSB modulation method using 6 MHz bandwidth, accordingly it is possible to provide a multimedia service combining broadcasting and communication even in SDTV (Standard Definition Television) circumstances when a STB (Set Top Box) is connected to a television set adapting a NTSC (National Television Standard Committee) method which is the present analog broadcasting standard.

In order to perform above-described television broadcasting services smoothly, development of a digital television relay system for relaying a certain quality broadcasting signal to subscribers in radio shadow areas is essentially required.

In other words, subscribers in the radio shadow areas such as a place under a high building or in shadow areas such as a remote place can not receive a broadcasting signal transmitted from a broadcasting station as a high quality. In this case, increasing output of the broadcasting station is difficult to realize because of high expenses and frequency legislation. Accordingly, the digital television relay system which is capable of transmitting a broadcasting signal after making a week broadcasting signal into a strong signal is required in order to provide the service to the shadow areas with low expenses.

SUMMARY OF THE INVENTION

In order to solve above-mentioned problems, the object of the present invention is to provide a digital television relay system which is capable of providing a digital television broadcasting service with a transmission quality same with a broadcasting station to a subscriber in shadow areas by compensating a transmission error occurred in space after receiving and channel-decoding a broadcasting signal transmitted from the digital television broadcasting station and channel-coding it again.

The digital television relay system according to the present invention comprises a front end unit for transmitting/receiving a certain broadcasting channel frequency signal, a VSB demodulator unit for converting the certain broadcasting channel frequency signal received from the front end unit into intermediate frequency and performing channel decoding with a VSB method, a VSB modulator unit for compensating a transmission error occurred on space about the signal channel-decoded on the VSB demodulator unit, an exciter unit for up-converting the signal outputted from the VSB modulator unit into a transmission channel frequency allotted so as to be different from a reception channel frequency, a power amplifying unit for amplifying power of the signal up-converted on the exciter unit, a VSB corrector unit for yielding a compensation value in order to compensate a non-linear error of the signal outputted from the power amplifying unit and providing it to the VSB modulator unit, and a control unit for performing overall control of the digital television relay system.

DETAILED DESCRIPTION OF THE PREFERRED EMBODIMENT

Hereinafter, the embodiment of the present invention will now be described in detail with reference to accompanying drawings.

Figure 1:
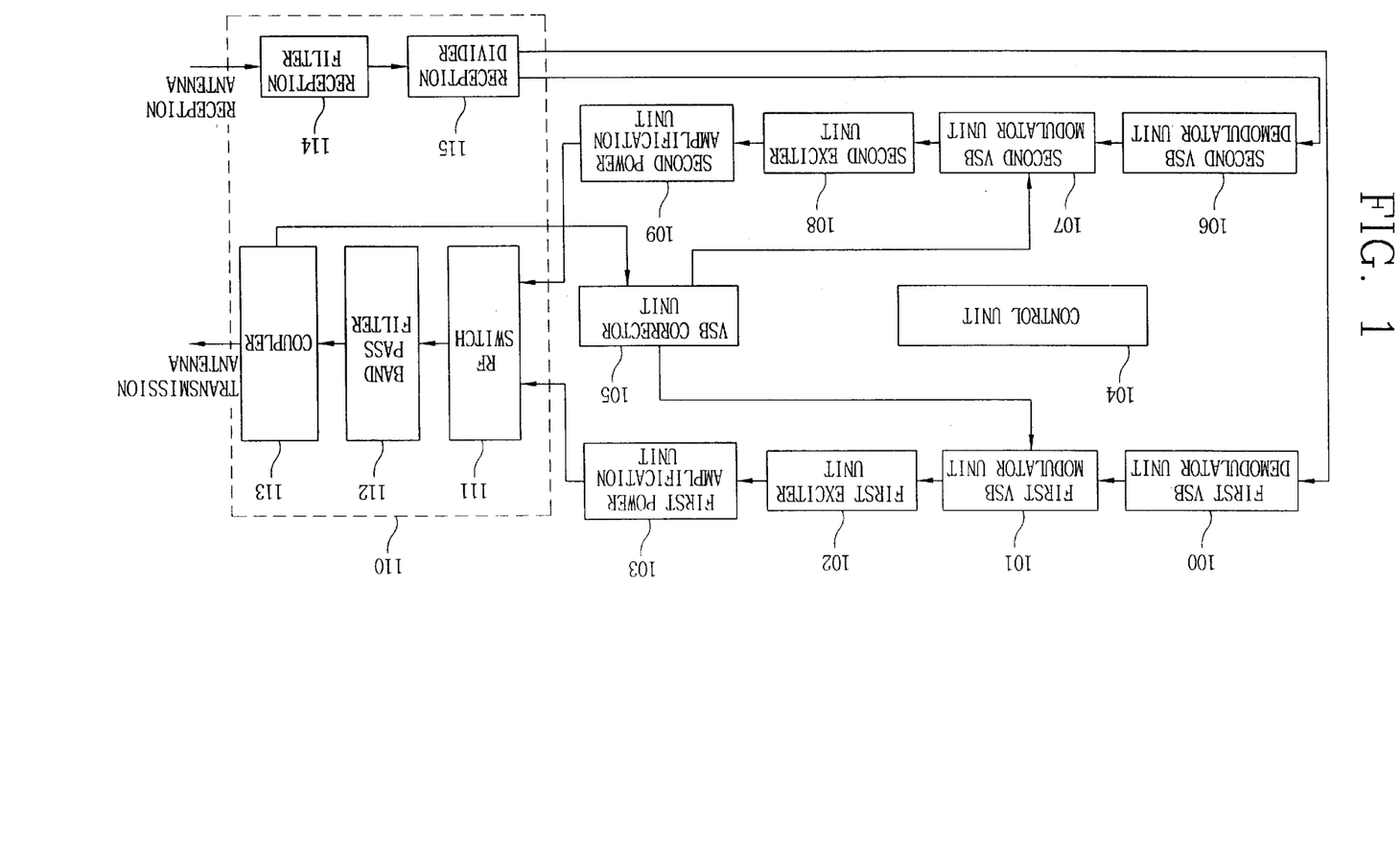
FIG. 1 is a block diagram illustrating an ATSC method digital television relay system in accordance with the embodiment of the present invention.

FIG. 1 is a block diagram illustrating an ATSC method digital television relay system in accordance with the embodiment of the present invention.

As depicted in FIG. 1, the digital television broadcasting system according to the present invention comprises a front end unit 110 for transmitting/receiving a certain broadcasting channel frequency signal, a VSB demodulator unit 100 for converting the certain frequency broadcasting channel signal received from the front end unit 110 into an intermediate frequency (IF) and performing channel-decoding it with a VSB method, a VSB modulator unit 101 for modulating the signal channel-decoded on the VSB demodulator unit 100 to a 8 VSB channel, an exciter unit 102 for up-converting the signal outputted from the VSB modulator unit 101 into a transmission channel frequency allotted in advance different from a reception channel frequency, a power amplification unit 103 for amplifying power of the signal up-converted on the exciter unit 102, a VSB corrector unit 105 for yielding a compensation value in order to compensate a non-linear error of the signal outputted from the power amplification unit 103 and providing it to the VSB modulator unit 101, and a control unit 104 for performing overall control of the digital television relay system.

The digital television relay system in accordance with the present invention further comprises a slave VSB demodulator unit 106, a slave VSB modulator unit 107, a slave exciter unit 108, and a slave power amplification unit 109 in order to operate as a duplexing structure, accordingly the present invention can increase credibility and stability of the performance of the system function.

As depicted in FIG. 1, the front end unit 110 comprises a reception filter unit for passing only broadcasting channel signal of a certain frequency allotted to the system and outputting it separately to the dual VSB demodulator units 100, 106, and a transmission filter unit for transmitting the signal of the certain broadcasting channel frequency.

The reception filter unit comprises a reception filter 114 for passing only broadcasting channel signal of the certain frequency allotted to the system and a reception divider 115 for transmitting separately a high frequency (RF) signal passed through the reception filter 114 to the VSB demodulator units 100, 106.

The transmission filter unit comprises a RF switch 111 for selecting one signal between signals outputted from the power amplification units 103, 109, a band pass filter 112 for passing the broadcasting channel signal of the certain frequency among the signals outputted from the RF switch 111, and a coupler 113 for outputting the broadcasting channel signal of the certain frequency outputted from the band pass filter 112 to a transmission antenna in order to discharge and to the VSB corrector unit 105 in order to report the present state.

The operation of the digital television relay system according to the present invention will now be described.

First, the certain broadcasting channel frequency signal applied from a reception antenna is outputted to the VSB demodulator units 100, 106 through the reception filter 114 and reception divider 115.

The VSB demodulator unit 100 converts the received RF signal into IF band pass and performs the channel-decoding in accordance with a VSB method. Herein, in order to perform the relay function, the digital television relay system has to allot the transmission channel frequency different from the reception channel frequency, accordingly the VSB demodulator unit 100 alters data corresponding to the frequency in a channel-decoded MPEG 2 TS signal. After that, the VSB demodulator unit 100 performs a CRC coding and a biphase line coding by using the altered data and transmits it to the VSB modulator unit 101.

The VSB modulator unit 101 performs a VSB modulation of the transmitted MPEG 2 TS signal with 8 level, compensates the transmission error occurred in space, and outputs it as an IF format to the exciter unit 102. The exciter unit 102 up-converts the received IF format MPEG 2 TS signal into a transmission channel frequency having a VHF (Very High Frequency) or a UHF (Ultra High Frequency) band pass. Herein, the up-conversion is performed in order to generate the transmission channel frequency different from the reception channel frequency, accordingly it is possible to relay a good quality broadcasting signal to a subscriber in shadow areas.

The power amplification unit 103 power-amplifies the transmission channel frequency up-converted on the exciter unit 102 with high power output, and outputs it to the front end unit 110.

The RF switch 111 of the front end unit 110 selects one signal between the transmission channel frequency signals separately outputted from the duplexed power amplification units 103, 109, the band pass filter 112 passes 6 MHz band pass on the basis of the center frequency of the selected transmission channel frequency signal, and outputs it to the coupler 113. The coupler 113 transmits the transmission channel frequency outputted from the band pass 112 to the transmission antenna, part of the transmission channel frequency signal is outputted to the VSB corrector unit 105.

The VSB corrector unit 105 converts the received transmission channel frequency signal into a base band signal, analyzes it in order to yield a compensation value for compensating non-linear distortion of the power amplification units 103, 109, and outputs the yielded compensation value to the VSB modulator unit 101.

The operation of the each unit constructing the digital television relay system according to the present invention will now be described in detail with reference to accompanying drawings.

The VSB demodulator units 100, 106, VSB modulator units 101, 107, exciter units 102, 108, power amplification units 103, 109 are embodied so as to be duplexed, accordingly only the one of the duplexed units will now be described separately.

Figure 2:
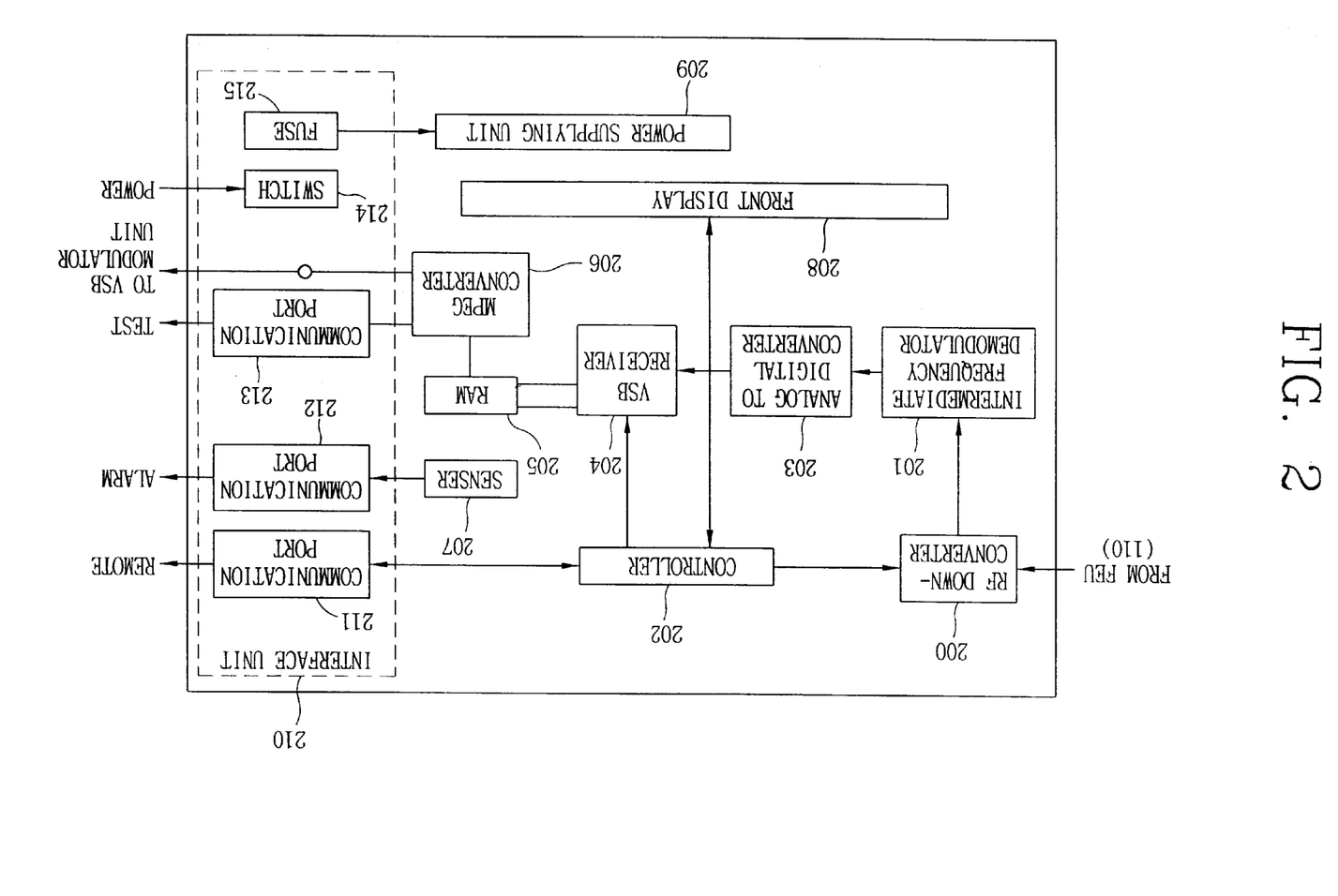
FIG. 2 is a block diagram illustrating a VSB demodulator unit of FIG. 1.

First, as depicted in FIG. 2, the VSB demodulator unit 100 comprises a frequency down-converter 200 for performing frequency down-conversion of the RF signal received from the front end unit 110 into an IF signal, an intermediate frequency demodulator 201 for dividing the IF signal outputted from the frequency down-converter 200 into an I signal and a Q signal (converting the IF signal into the base band signal), an analog to digital converter 203 for converting the I signal and Q signal outputted from the intermediate frequency demodulator 201 into a digital signal, a VSB receiver 204 for reproducing the MPEG 2 TS signal by using the digital I signal and Q signal outputted from the analog to digital converter 203, a MPEG converter 206 for performing a biphase line coding of the MPEG 2 TS signal outputted from the VSB receiver 204 into a required format by the VSB modulator unit 101 and outputting it to the VSB modulator 101, and a control unit 202 for controlling the overall operation of the VSB demodulator 100.

Hereinafter, the operation of the VSB demodulator unit 100 will now be described.

The frequency down-converter 200 performs the frequency down-conversion of the RF signal received from the front end unit 110 into the IF signal by using the 10 MHz provided from the exciter unit 102. The frequency demodulator 201 divides the IF signal outputted from the frequency down-converter 200 into the I signal and Q signal.

The analog to digital converter 203 converts the I signal and Q signal outputted from the intermediate frequency demodulator 201 into the digital signal and outputs it to the VSB receiver 204. The VSB receiver 204 reproduces the MPEG 2 TS signal by using the digital I signal and Q signal outputted from the analog to digital converter 203 and stores it on a ram 205. The MPEG converter 206 performs the biphase line coding of the MPEG 2 TS signal generated by the VSB receiver 204 and stored on the ram 205 into a format requested by the VSB modulator 101. Herein, the MPEG converter 206 alters data corresponding to the frequency in the MPEG 2 TS in order to allot the transmission channel frequency different from the received RF signal, performs a CRC (Cycle Redundancy Check) coding using the altered data, and performs the biphase line coding. After that, it outputs the biphase line-coded serial data to the VSB modulator 101.

The controller 202 designates a register value of the RF down-converter 200 and VSB receiver 204, and performs the control function for communicating with an external apparatus with a RS-232C method.

Figure 3:
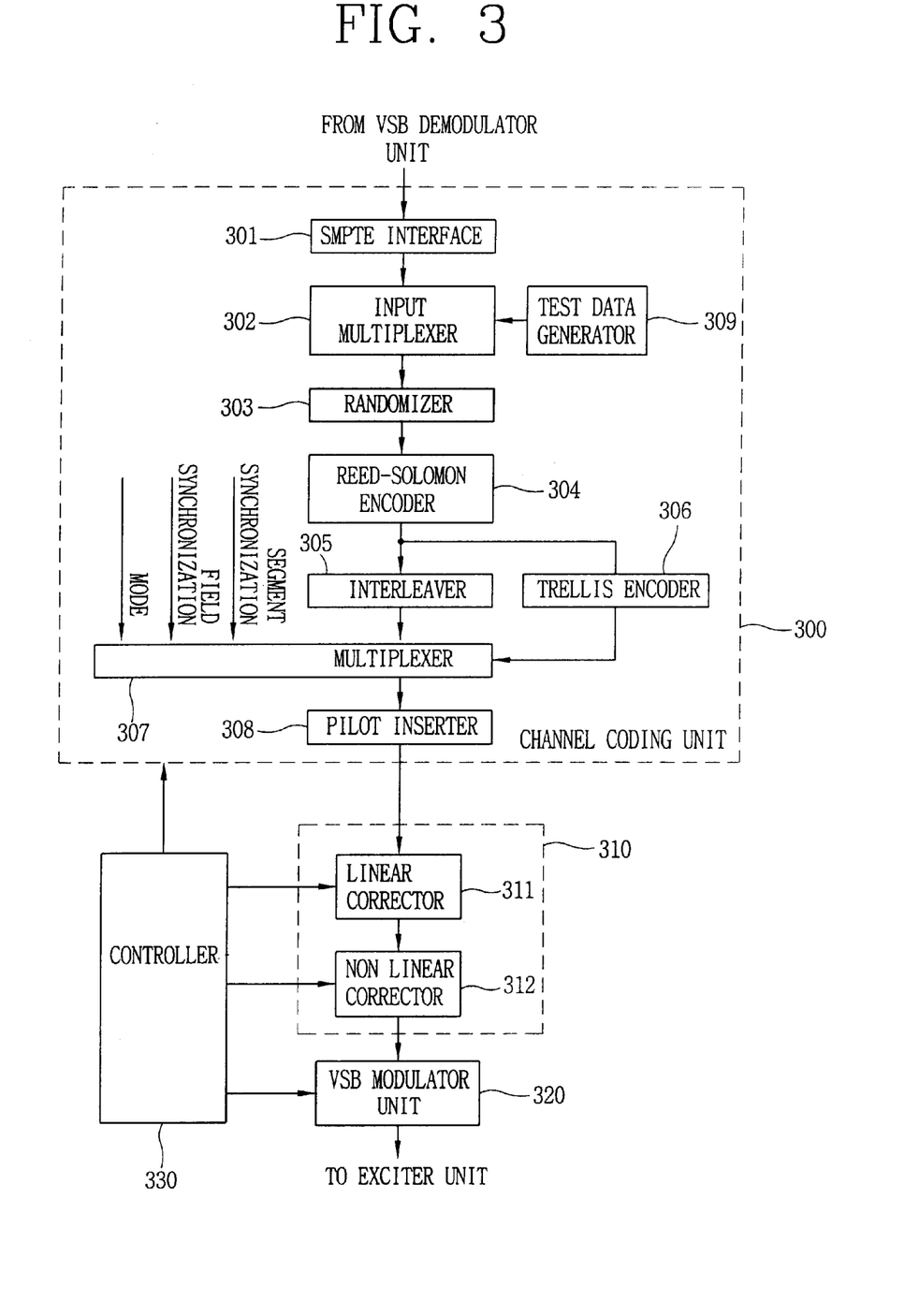
FIG. 3 is a block diagram illustrating a VSB modulator unit of FIG. 1.

After that, the construction of the VSB modulator 101 will now be described.

As depicted in FIG. 3, the VSB modulator 101 comprises a channel coding unit 300 for processing the MPEG 2 TS signal outputted from the VSB demodulator unit 100 so as to agree with a SMPTE (Society of Motion Picture and Television Engineers) standard and performing the channel coding, a digital filter unit 310 for compensating the transmission error occurred in space and non-linear distortion of the power amplification unit 103 by digital-filtering the cannel-decoded signal and performing a linear correction function, a VSB modulator 320 for VSB-modulating the digital signal outputted from the digital filter unit 310 into 8 levels, and a controller 330 for performing the overall control of the VSB modulator 101.

The channel coding unit 300 comprises a SMPTE interface 301 for receiving the MPEG 2 TS signal biphase-line-coded according to the SMPTE standard from the VSB demodulator 100 and converting it into a NRZ (none Return to Zero) signal by restoring a clock and data and performing the biphase line decoding, a test data generator 309 for generating a signal for testing the performance of the system, an input multiplexer 302 for selecting the signal outputted from the SMPTE interface 301 and the signal outputted from the test data generator 309, a randomizer 303 for randomizing by using the signal selected on the input multiplexer 302, a reed-solomon encoder 304 for performing a reed-solomon encoding of the signal outputted from the randomizer 303, and interleaver 305 for converting the signal outputted from the reed-solomon encoder 304 into frame data by interleaving, a trellis encoder 306 for converting the signal outputted from the reed-solomon encoder 304 into the frame data by performing the trellis encoding, a multiplexer 307 for inserting a field synchronization signal and a segment synchronization signal into the frame data outputted from the interleaver 305 and trellis encoder 306, and a pilot inserter 308 for inserting a pilot signal into the frame data outputted from the multiplexer 307 and outputting it to the digital filter unit 310.

The digital filter unit 310 comprises a linear corrector 311 for performing the digital filtering of the frame outputted from the channel coding unit 300, performing the linear correction function and compensating the transmission error occurred in space, and a non-linear corrector 312 for compensating the non-linear distortion of the power amplification unit 103 about the signal outputted from the linear corrector 311.

The operation of the VSB modulator unit 101 will now be described in detail.

The SMPTE interface 301 of the channel coding unit 300 receives the MPEG 2 TS signal biphase line-coded according to the SMPTE standard from the VSB demodulator unit 100, restores the clock and data, and performs the biphase line decoding. According to it, serial data converted into the NRZ (None Return to Zero) is converted into the 8 bit parallel data, and is inputted to the input multiplexer 302.

When the performance of the system is tested, the test data generator 309 generates the test data, and inputs it to the input multiplexer 302.

The output signal of the SMPTE interface 301 selected from the input multiplexer 302 is converted into the prescribed frame format by performing interleaving or trellis encoding after randomizing and reed-solomon encoding.

The multiplexer 307 inserts the field synchronization signal and segment synchronization signal into the frame format converted data, and outputs it to the pilot inserter 308. The pilot inserter 308 insets the pilot signal into the frame data outputted from the multiplexer 307, and outputs it to the digital filter unit 310.

The linear corrector 311 of the digital filter unit 310 performs the digital filtering of the pilot signal inserted frame, performs the linear correction function, and compensates the transmission error occurred in space. In other words, the linear corrector 311 performs the filtering of the pilot signal inserted 8 bit 8 level 10.76 MHZ trellis code by dividing it into the I channel and Q channel. Herein, the each channel performs double interpolation in order to reduce damping on the VSB modulator 420, two filters per each channel perform a FIR (finite Impulse Response) filtering of 288 tap with 14 bit coefficient range, and performs a pulse-shaping.

The non-linear corrector 312 compensates the non-linear distortion of the power amplification unit 103 about the signal outputted from the linear corrector 311. Accordingly, it is possible to perform the relay service with the quality same with the transmitting quality of the broadcasting station to the subscriber in the shadow areas.

In other words, in order to compensate the non-linear distortion due to the non-linear character of a final terminal of the VSB modulator unit 101 and power amplification unit 103, the non-linear corrector 312 improves the linear character of the final output terminal of the digital television relay system by performing pre-distortion of 21.52 MHz signal inputted from the linear corrector 311. Herein, the non-linear distortion is performed by performing complex number computing of a complex correction value selected on the basis of the I signal and Q signal inputted from the linear corrector 311 and I signal and Q signal in a correction LUT (lookup Table).

The VSB modulator 320 VSB-modulates the digital signal distortion-compensated on the non-linear corrector 312 with 8 levels, and outputs it to the frequency modulator unit 102. The VSB modulator 320 performs a function for compensating phase error occurred in the modulation, a function for converting the phase-compensated digital signal into an analog signal, a function for converting the analog converted band pass signal into 44 MHz intermediate frequency, a function for filtering the intermediate frequency signal and amplifying it, a function for phase-locking the pilot signal, and etc.

Figure 4:
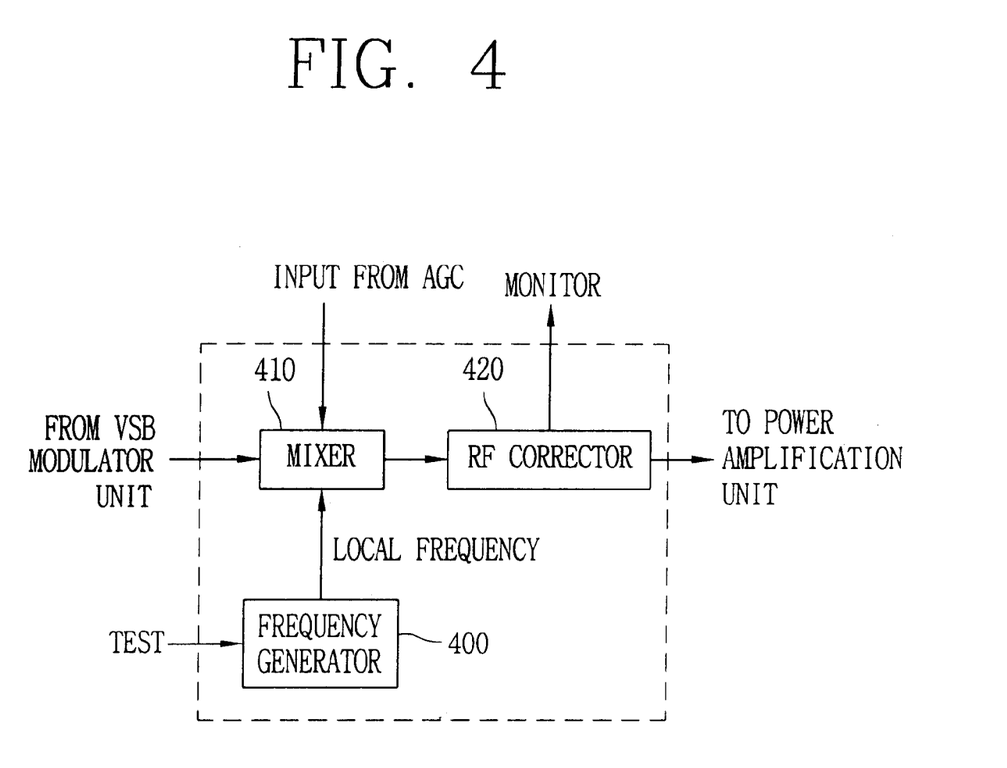
FIG. 4 is a block diagram illustrating an exciter unit of FIG. 1.

Next, As depicted in FIG. 4, the construction of the exciter unit 102 will now be described.

The exciter unit 102 comprises a synthesizer 400 for generating local frequency in accordance with a broadcasting channel of a certain frequency allotted to the system, a mixer 410 for generating a transmission channel frequency different from a reception frequency channel by mixing the local frequency generated on the synthesizer 400 and the 44 MHz IF signal 8 VSB-modulated by the VSB modulator 101, and a RF corrector 420 for correcting the distortion by pre-distorting the transmission channel frequency signal outputted from the mixer 410.

The operation of the frequency modulator unit 102 will now be described in detail.

The synthesizer 400 generates appropriate local frequency in accordance with the broadcasting channel of the certain frequency allotted to the system. The synthesizer 400 generates 10 MHz reference frequency by using a DTCXO (Digital Processing Temperature Compensated Crystal Oscillator).

The mixer 410 generates the transmission channel frequency different from the reception frequency channel by mixing the 44 MHz IF signal 8 VSB-modulated by the VSB modulator unit 101.

The RF corrector 420 corrects the non-linear distortion of the power amplification unit 103 by performing the pre-distortion of the transmission channel frequency signal outputted from the mixer 410, and outputs it to the power amplification unit 103.

Figure 5:
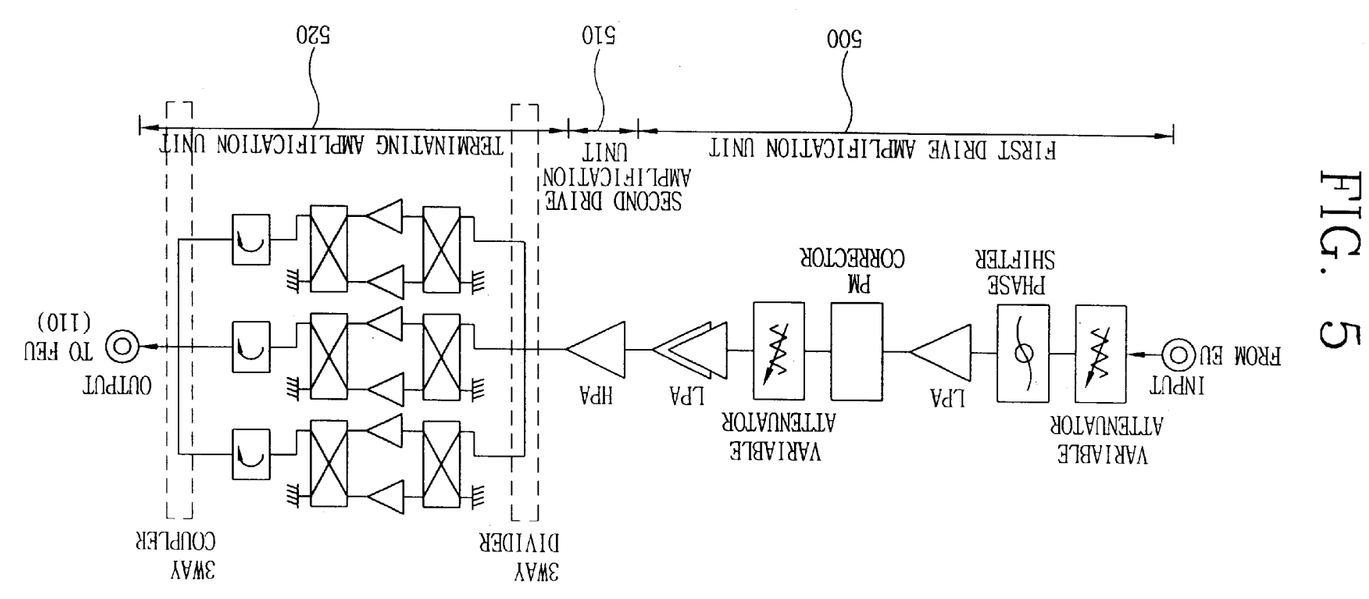
FIG. 5 is a block diagram illustrating a power amplification unit of FIG. 1.

Next, the construction of the power amplification 103 will now be described in detail.

As depicted in FIG. 5, the power amplification unit 103 comprises a first drive amplification unit 500 for performing a volume damping function, a phase shifting function, a low noise amplification function about the transmission channel frequency signal so as to get the transmission channel frequency signal outputted from the exciter unit 102 be adaptable to the power amplification, a second drive amplification unit 510 for performing the power amplification of the transmission channel frequency outputted from the first drive amplification unit 500, and a terminating amplification unit 520 for transmitting the transmission channel frequency signal outputted from the second drive amplification unit 510 to a back end.

The operation of the power amplification unit 103 will now be described in detail.

The transmission channel frequency signal outputted from the exciter unit 102 is applied to the first drive amplification unit 500, the RF signal applied to the first drive amplification unit 500 is inputted to a LNA (Low Noise Amplifier) through a damper using 3 dB coupler and a phase shifter adjusting output phase of the power amplification unit 103. The LNA performs the low noise amplification, and outputs it to the second drive amplification unit 510.

The second drive amplification unit 510 performs the power amplification of the transmission channel frequency signal outputted from the first drive amplification unit 500, and outputs it to the terminating amplification unit 520.

The terminating amplification unit 520 outputs the transmission channel frequency signal outputted from the second drive amplification unit 510 to the front end unit 110.

Figure 6:
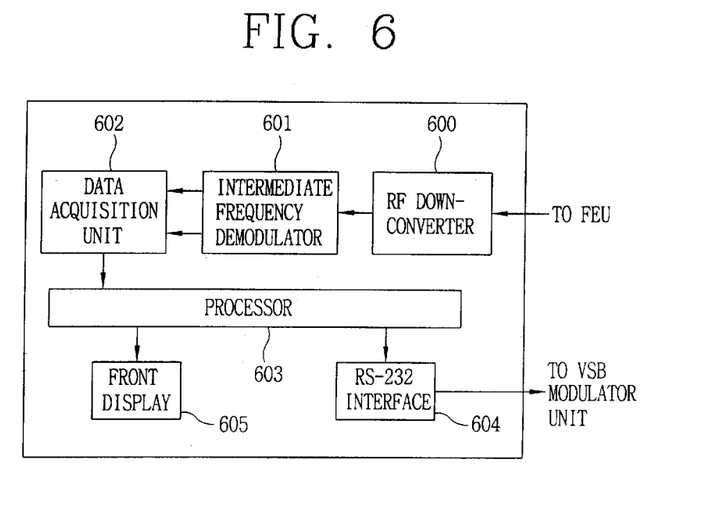
FIG. 6 is a block diagram illustrating a VSB of FIG. 1.

Next, the construction of the VSB corrector unit 105 will now be described in detail.

As depicted in FIG. 6, the VSB corrector unit 105 comprises a RF down-converter 600 for converting the transmission channel frequency signal outputted from the front end unit into a IF signal, an IF demodulator 610 for converting the IF signal outputted from the RF down-converter 600 into a base band signal, a data acquisition unit 602 for converting the band base signal converted on the IF demodulator 601 into digital data, a processor 603 for extracting a compensation value for compensating the non-linear error occurred on the power amplification unit 103 by analyzing the digital data outputted from the data acquisition unit 602, and a communication port (RS-232 Interface) 604 for outputting the compensation value extracted from the processor 603 to the VSB modulator unit 101.

The operation of the VSB corrector unit 105 will now be described in detail. The RF down-converter 600 of the VSB corrector unit 105 converts the transmission channel frequency signal transmitted from the coupler 113 of the front end unit 110 into the IF signal. The IF modulator 601 divides the IF signal outputted from the RF down converter into the I signal and Q signal. The data acquisition unit 602 converts the I signal and Q signal outputted from the IF demodulator 601 into the digital data, and outputs it to the processor 603. The processor 603 analyzes the digital data, extracts the compensation value for compensating the non-linear error occurred on the power amplification unit 103, and outputs it to the VSB modulator unit 101 through the communication port (RS-232 Interface) 604.

Figure 7:
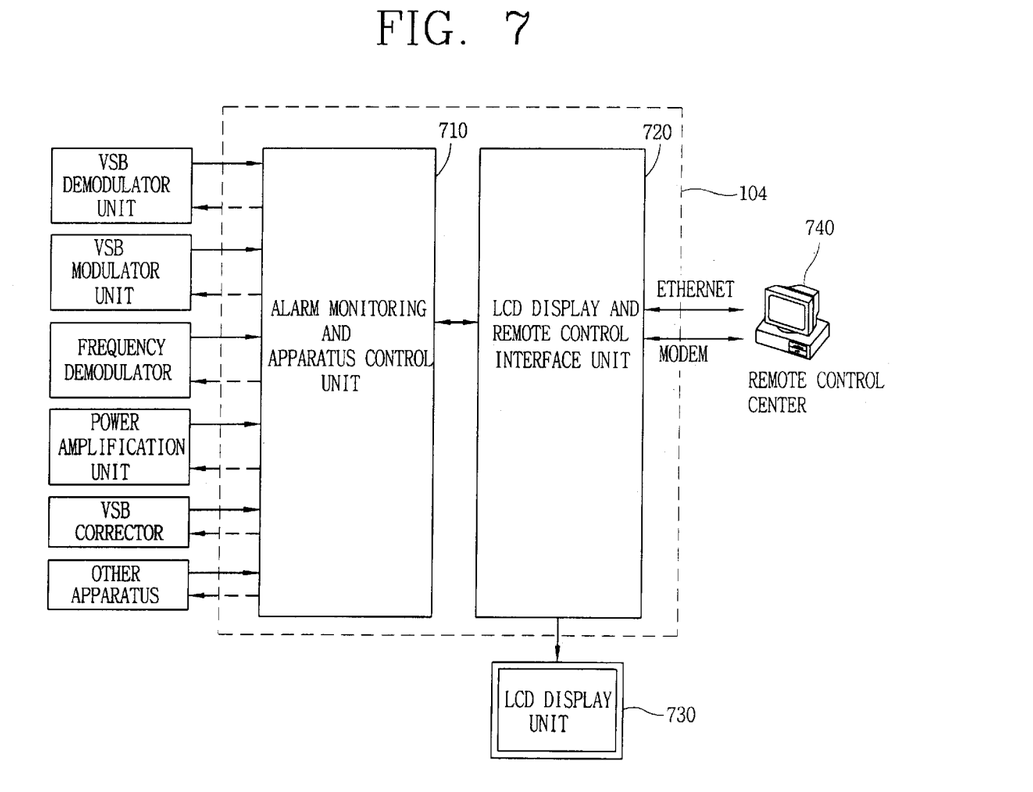
FIG. 7 is a block diagram illustrating a control unit of FIG. 1.

The construction of the control unit 104 will now be described.

As depicted in FIG. 7, the control unit 104 comprises an alarm monitoring and apparatus control unit 710, a LCD (Liquid Crystal Display) and remote control interface unit 740, and a LCD display unit 730.

The alarm monitoring and apparatus control unit 710 receives and analyzes alarm information generated from the VSB demodulator units 100, 106, VSB modulator units 101, 107, exciter units 102, 108, power amplification units 103, 109, VSB corrector unit 105 and additional apparatus, performs the duplexing control in accordance with the importance of the alarm, and manages the each unit in accordance with the control of a remote control center 740. The LCD display and remote control interface unit 720 displays the alarm transmitted from the alarm monitoring and apparatus control unit 710, and performs interface with the remote control center 740 placed in remote place through a modem or an Ethernet.

The operation of the control unit 104 will now be described in detail.

The control unit 104 receives and analyzes alarm information generated from the VSB demodulator units 100, 106, VSB modulator units 101, 107, exciter units 102, 108, power amplification units 103, 109, VSB corrector unit 105 and additional apparatus, and judges the importance of the alarm in accordance with the analysis result.

In the judgement result, when the alarm can affect serious influence to the system, the alarm monitoring and apparatus control unit 710 makes the digital television relay system operate normally and continually by performing the duplexing control between the main units and slave units for the alarm restoration. Herein, when the main units are the VSB demodulator unit 100, VSB modulator unit 101, exciter unit 102, power amplification unit 103, the slave units are the VSB demodulator units 106, VSB modulator unit 107, exciter unit 108, power amplification unit 109, dual exchange between them is performed.

In addition, in the judgement result, when the alarm does not affect such a big influence, the alarm monitoring and apparatus control unit 710 transmits the alarm information to the LCD display and remote control interface unit 720. And, the LCD display and remote control interface unit 720 transmits the alarm information to the LCD display unit 730, the LCD display unit 730 displays the alarm in order to inform the alarm generation to an operator.

And, the LCD display and remote control interface unit 720 receives a signal for informing the alarm occurrence on the present digital television relay system from the alarm monitoring and apparatus control unit 710, and transmits the signal to the remote control center 740 through the Ethernet or modem. When the duplexing control order or system control order is transmitted from the remote control center 740, the LCD display unit and remote control interface unit 720 transmits the order to the alarm monitoring and apparatus control unit 710, and the alarm monitoring and apparatus control unit 710 controls the each unit.

As described above, the digital television relay system according to the present invention can provide the digital television broadcasting service with transmission quality same with the broadcasting station to the subscriber in the shadow areas.

In addition, the present invention can control the digital television relay system in the remoter place through the external communication network such as the Ethernet, accordingly it makes easier operation and maintenance of the system.

What is claimed is:

1. A digital television relay system, comprises:

a front end unit for transmitting/receiving a certain broadcasting channel frequency signal;

a VSB demodulator unit for converting the certain broadcasting channel frequency signal received from the front end unit into intermediate frequency and performing channel decoding with a VSB method;

a VSB modulator unit for compensating a transmission error occurred on space about the signal channel-decoded on the VSB demodulator unit;

an exciter unit for up-converting the signal outputted from the VSB modulator unit into a transmission channel frequency allotted so as to be different from a reception channel frequency;

a power amplifying unit for amplifying power of the signal up-converted on the exciter unit;

a VSB corrector unit for yielding a compensation value in order to compensate a non-linear error of the signal outputted from the power amplifying unit and providing it to the VSB modulator unit; and a control unit for performing overall control of the digital television relay system.

2. The digital television relay system according to claim 1, wherein the VSB demodulator unit, VSB modulator unit, exciter unit, power amplification unit are separately constructed so as to be duplexed.

3. The digital television relay system according to claim 1, wherein the front end unit comprises:

a reception filter unit for passing broadcasting channel signal of a certain frequency allotted to the system and outputting it separately to the duplexed VSB demodulator units; and a transmission filter unit for transmitting the signal of the certain broadcasting channel frequency.

4. The digital television relay system according to claim 3, wherein the reception filter unit comprises:

a reception filter for passing the broadcasting channel signal of the certain frequency allotted to the system; and a reception divider for transmitting separately a high frequency RF signal passed through the reception filter to the two VSB demodulator units.

5. The digital television relay system according to claim 3, wherein the transmission filter unit comprises:

a RF switch for selecting one signal between signals separately outputted from the duplexed power amplification units;

a band pass filter for passing a broadcasting channel signal of a certain frequency among signals outputted from the RF switch; and a coupler for outputting the broadcasting channel signal of the certain frequency outputted from the band pass filter to a transmission antenna in order to delivery and to the VSB corrector unit in order to report the present state.

6. The digital television relay system according to claim 1, wherein the VSB demodulator unit comprises:

a frequency down-converter for down-converting frequency of a RF signal received from the front end unit into an IF signal;

an intermediate frequency demodulator for converting the IF signal outputted from the frequency down converter into a base band signal;

an analog to digital converter for converting the base band signal outputted from the intermediate frequency demodulator into digital data;

a VSB receiver for reproducing a MPEG signal by using the digital data outputted from the analog to digital converter;

a MPEG converter for performing biphase line coding of the MPEG signal outputted from the VSB receiver in order to convert the format of the MPEG signal into a required format by the VSB modulator unit and outputting it to the VSB modulator; and a controller for controlling the overall operation of the VSB demodulator unit.

7. The digital television relay system according to claim 6, wherein the MPEG converter alters data corresponding to the frequency in the MPEG signal in order to allot the transmission channel frequency different from the frequency of the received RF signal, and performs a CRC coding reflecting the altered data.

8. The digital television relay system according to claim 1, wherein the VSB modulator unit comprises:

a channel coding unit for processing the MPEG signal outputted from the VSB demodulator unit so as to agree with a SMPTE (Society of Motion Picture and Television Engineers) standard and perform the channel coding;

a digital filter unit for compensating a transmission error occurred in space and non-linear distortion of the power amplification unit by digital-filtering the cannel-coded signal and performing a linear correction function;

a VSB modulator for VSB-modulating the digital signal outputted from the digital filter unit into 8 levels; and a controller for performing the overall control of the VSB modulator unit.

9. The digital television relay system according to claim 8, wherein the channel coding unit comprises:

a SMPTE interface for receiving the MPEG signal biphase-line-coded in accordance with the SMPTE standard from the VSB demodulator unit and converting it into a NRZ (none Return to Zero) signal by restoring a clock and data and performing a biphase line decoding;

a test data generator for generating a signal for testing the performance of the system;

an input multiplexer for selecting the signal outputted from the SMPTE interface and the signal outputted from the test data generator;

a randomizer for randomizing by using the signal selected on the input multiplexer;

a reed-solomon encoder for performing a reed-solomon encoding of a signal outputted from the randomizer;

an interleaver for converting the signal outputted from the reed-solomon encoder into frame data by interleaving;

a trellis encoder for converting the signal outputted from the reed-solomon encoder into frame data by performing a trellis encoding;

a multiplexer for inserting a field synchronization signal and a segment synchronization signal into the frame data outputted from the interleaver and trellis encoder; and a pilot inserter for inserting a pilot signal into the frame data outputted from the multiplexer and outputting it to the digital filter unit.

10. The digital television relay system according to claim 8, wherein the digital filter unit comprises:
- a linear corrector for performing the digital filtering of the frame outputted from the channel coding unit and compensating the transmission error occurred in space by performing the linear correction function; and
- a non-linear corrector for compensating the non-linear distortion of the power amplification unit about the signal outputted from the linear corrector.

11. The digital television relay system according to claim 1, wherein the exciter unit comprises:
- a synthesizer for generating a local frequency in accordance with a broadcasting channel of a certain frequency allotted to the system;
- a mixer for generating a transmission channel frequency different from a reception frequency channel by mixing the local frequency generated on the synthesizer and the IF signal 8 VSB-modulated on the VSB modulator; and
- a RF corrector for correcting the distortion by pre-distorting the transmission channel frequency signal outputted from the mixer.

12. The digital television relay system according to claim 1, wherein the power amplification unit comprises:
- a first drive amplification unit for performing a volume damping function, a phase shifting function, a low noise amplification function about the transmission channel frequency signal outputted from the exciter unit so as to be adaptable to power amplification;
- a second drive amplification unit for performing power amplification of the transmission channel frequency signal outputted from the first drive amplification unit; and
- a terminating amplification unit for transmitting the transmission channel frequency signal outputted from the second drive amplification unit to a transmission antenna.

13. The digital television relay system according to claim 1, wherein the VSB corrector unit comprises:
- a RF down-converter for converting the transmission channel frequency signal outputted from the front end unit into an IF signal;
- an IF demodulator for converting the IF signal outputted from the RF down-converter into a base band signal;
- a data acquisition unit for converting the base band signal converted on the IF demodulator into digital data;
- a processor for extracting a compensation value for compensating the non-linear error occurred on the power amplification unit by analyzing the digital data outputted from the data acquisition unit; and
- a communication port 604 for outputting the compensation value extracted from the processor to the VSB modulator unit.

14. The digital television relay system according to claim 1, wherein the control unit comprises:
- an alarm monitoring and apparatus control unit for receiving and analyzing alarm information generated from the VSB demodulator units, VSB modulator units, exciter units, power amplification units, VSB corrector unit, performing the duplexing control in accordance with the importance of the alarm, and managing the each unit in accordance with the control of a remote control center;
- a LCD display and remote control interface unit for displaying the alarm transmitted from the alarm monitoring and apparatus control unit and performing interface with the remote control center placed in the remote place; and
- a LCD display for displaying a certain information in accordance with the control of the LCD display and remote control interface unit.

15. A digital television relay system, comprising:
- a front end unit for transmitting/receiving a certain broadcasting channel frequency signal;
- a VSB demodulator unit for converting the certain broadcasting channel frequency signal received from the front end unit into intermediate frequency and performing channel decoding with a VSB method;
- a VSB modulator unit for compensating a transmission error occurred on space about the signal channel-decoded on the VSB demodulator unit;
- an exciter unit for up-converting the signal outputted from the VSB modulator unit into a transmission channel frequency allotted in advance so as to be different from a reception channel frequency;
- a power amplifying unit for amplifying power of the signal up-converted on the exciter unit;
- a VSB corrector unit for yielding a compensation value in order to compensate a non-linear error of the signal outputted from the power amplifying unit and providing it to the VSB modulator unit; and
- a control unit for performing overall control of the digital television relay system.

16. The digital television relay system according to claim 15, wherein the certain transmission channel frequency is different from the reception channel frequency.

17. The digital television relay system according to claim 15, wherein the digital television relay system further comprises a power amplification unit for amplifying power of the transmission channel frequency allotted from the exciter unit.

18. The digital television relay system according to claim 15, wherein the VSB demodulator unit comprises:
- a frequency down-converter for down-converting frequency of a RF signal received from the front end unit into an IF signal;
- an intermediate frequency demodulator for converting the IF signal outputted from the frequency down converter into a base band signal;
- an analog to digital converter for converting the base band signal outputted from the intermediate frequency demodulator into digital data;
- a VSB receiver for reproducing a MPEG signal by using the digital data outputted from the analog to digital converter; and
- a MPEG converter for performing biphase line coding of the MPEG signal outputted from the VSB receiver in order to convert the format of the MPEG signal into a required format by the VSB modulator unit and outputting it to the VSB modulator.

19. The digital television relay system according to claim 15, wherein the VSB modulator unit comprises:
- a channel coding unit for processing the MPEG signal outputted from the VSB demodulator unit so as to agree with a SMPTE (Society of Motion Picture and Television Engineers) standard and perform the channel coding;
- a digital filter unit for compensating a transmission error occurred in space and non-linear distortion of the power amplification unit by digital-filtering the cannel-coded signal and performing a linear correction function; and a VSB modulator for VSB-modulating the digital signal outputted from the digital filter unit into 8 levels.

20. The digital television relay system according to claim 15, wherein the exciter unit comprises:

a synthesizer for generating a local frequency in accordance with a broadcasting channel of a certain frequency allotted to the system;

a mixer for generating a transmission channel frequency different from a reception frequency channel by mixing the local frequency generated on the synthesizer and the IF signal 8 VSB-modulated on the VSB modulator; and a RF corrector for correcting the distortion by pre-distorting the transmission channel frequency signal outputted from the mixer.

* * * * *